United States Patent [19]
Fer

[11] 4,148,172
[45] Apr. 10, 1979

[54] BLINKER ASSEMBLY

[76] Inventor: Pete Fer, 2020 S. Mesa St., San Pedro, Calif. 90731

[21] Appl. No.: 720,608

[22] Filed: Sep. 7, 1976

[51] Int. Cl.² ............................................. B68C 5/00
[52] U.S. Cl. ............................................................ 54/80
[58] Field of Search .................. 54/10, 11, 80, 81; 2/10, 11, 15; 119/143, 104, 97 R; 273/190A; 350/293, 297, 296, 298

[56] References Cited

U.S. PATENT DOCUMENTS

| | | | |
|---|---|---|---|
| 1,461,301 | 7/1923 | Wiskott | 350/293 |
| 2,176,167 | 10/1939 | Comstock | 350/298 X |
| 2,871,642 | 2/1959 | Damone | 54/80 |
| 4,040,239 | 8/1977 | Powell | 54/80 |

FOREIGN PATENT DOCUMENTS 79648 7/1955 Denmark .................. 119/104

*Primary Examiner*—Richard J. Apley
*Attorney, Agent, or Firm*—Lyon & Lyon

[57] ABSTRACT

Blinkers and blinker methods for horses which employ a mirrored inner surface. These blinkers and the method of employing such blinkers have been found to be highly successful in overcoming running problems of thoroughbreds.

1 Claim, 3 Drawing Figures

BLINKER ASSEMBLY

BACKGROUND OF THE INVENTION

The present invention is directed to improved blinkers and blinker methods for horses.

Many horses have been found to have perceptual and psychological problems which cause them to be functionally incapable of participating in horse races. Often a horse will chronically run toward the outside rather than the inside rail during a race. A horse may also be bothered by other horses and riders around him. As a result of these problems, these horses are generally unable to properly compete in conventional horse races.

To overcome the above problems, blinkers have been devised to shut out to a greater or lesser degree the vision of a problem horse. Although some success has been experienced with such blinkers, they have not proven to be universally successful. Such blinkers come in a variety of configurations and cover one-half, three-quarters or all of the horse's vision from one eye. The blinkers are generally of plastic and are sewn on to a headdress over the eyeholes.

SUMMARY OF THE INVENTION

The present invention is directed to blinkers and blinker methods for race horses wherein the blinkers have a reflective inner surface. This reflective inner surface reflects light and motion for perception by the horse. Thus, the concept and purpose of a traditional blinker has been exactly reversed. Rather than shutting out light and motion, light and motion are added. However, light and motion are reflected from a different direction. The net effect which has been experienced in employing such reflective blinkers has been to overcome the horses problems with running.

Accordingly, it is an object of the present invention to provide a means for overcoming running problems in horses.

It is another object of the present invention to provide improved blinkers, blinker assemblies and blinker methods for use on race horses.

Other objects and advantages will appear hereinafter.

DETAILED DESCRIPTION OF THE PREFERRED EMBODIMENT

Figure 1:
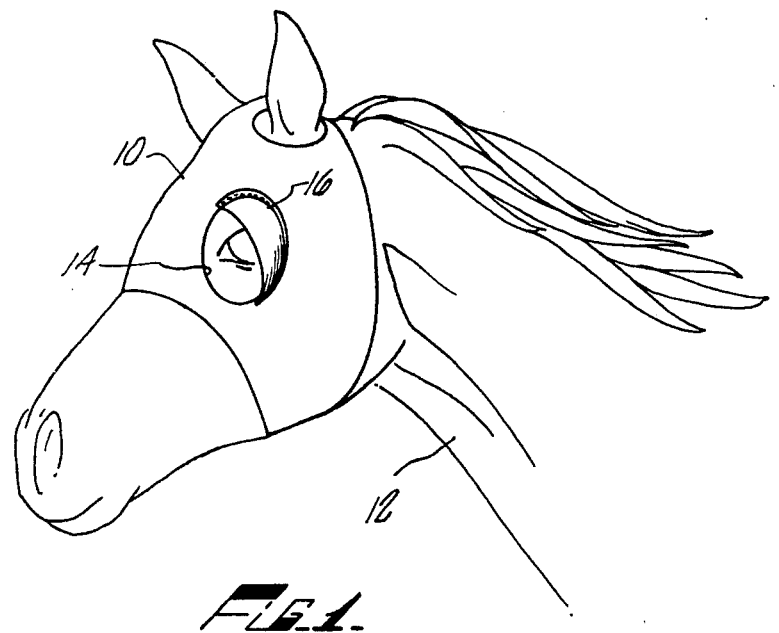
FIG. 1 illustrates a horse wearing a device of the present invention.
Figures 2, 3:
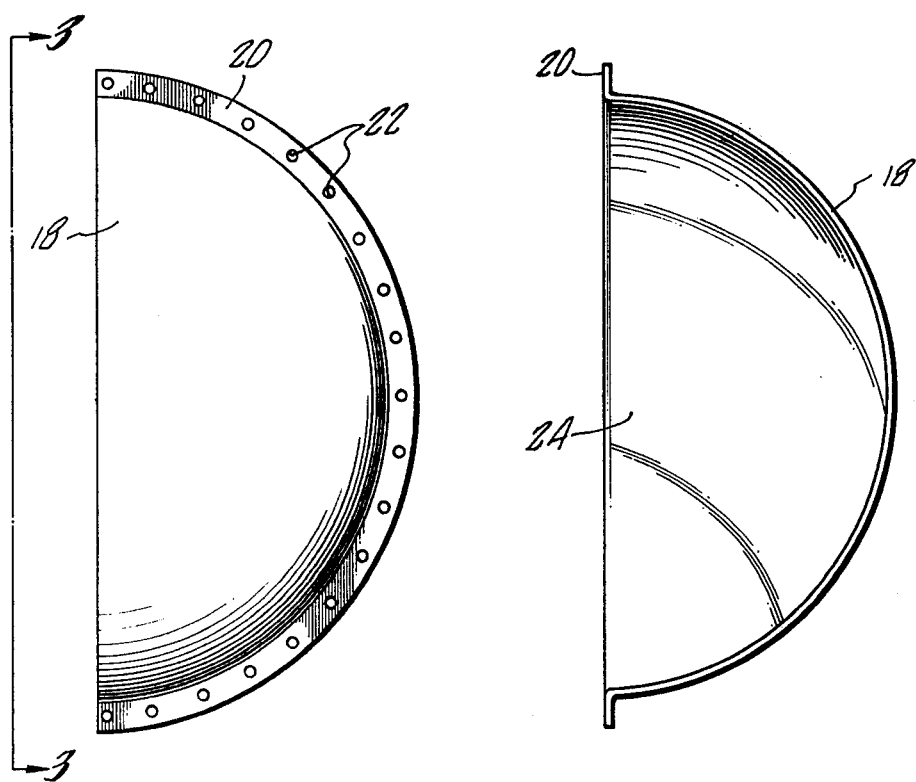
FIG. 2 is a top view of a blinker of the present invention.
FIG. 3 is a front view of the present invention taken along line 3—3 of FIG. 2 and illustrating the mirrored inner surface.

The present invention is directed to a conventional blinker except for the new feature of a reflective surface on the inner side of the blinker. The blinker assembly includes a headdress 10 which is shown in FIG. 1 positioned on a horse 12. Eyeholes 14 are cut through the headdress 10 such that the horse's vision is not obstructed by the headdress itself.

Stitched directly to the headdress 10 are blinkers 16. One or two blinkers 16 may be employed as needed. Each blinker is of unitary construction and is most often of high impact plastic. The shape of each blinker approaches a segment 18 of a sphere. A mounting flange 20 extends around one edge of the segment 18 for attachment to the headdress 10. Holes 22 are provided for stitching the blinker to the headdress. The present invention contemplates the use of blinkers conforming to all of the traditional shapes. Such traditional blinkers include half blinkers such as shown, three-quarter blinkers which include greater coverage of the eye and other similar shapes.

The improvement provided by the present invention which provides an entirely new function to the traditional blinker is a reflective inner surface 24. This reflective inner surface is most conveniently provided by plating a blinker to provide a thin metallic coating which is capable of reflecting light and motion to the horses eye. Plating processes are normally such that a mirrored surface is provided on the inner side of the blinker.

Thus, an improved blinker and method have been provided by the present invention for improving the running of horses. While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A blinker assembly for a horse, comprising
   a headdress for a horse, having holes for the horse's eyes; and
   at least one blinker attached to said headdress to partially obscure the vision of the horse, said blinker having a mirrored surface on the inside thereof such that the horse will see said mirrored surface.

* * * * *